(12) United States Patent
Virtanen

(10) Patent No.: US 6,416,727 B1
(45) Date of Patent: Jul. 9, 2002

(54) APPARATUS AND PROCESS FOR THE PREPARATION OF PRECIPITATED CALCIUM CARBONATE

(75) Inventor: Pentti Virtanen, Toijala (FI)

(73) Assignee: FP-Pigments Oy, Espoo (FI)

( * ) Notice: Subject to any disclaimer, the term of this patent is extended or adjusted under 35 U.S.C. 154(b) by 0 days.

(21) Appl. No.: 09/381,230

(22) PCT Filed: Mar. 19, 1998

(86) PCT No.: PCT/FI98/00244

§ 371 (c)(1),
(2), (4) Date: Dec. 29, 1999

(87) PCT Pub. No.: WO98/41475

PCT Pub. Date: Sep. 24, 1998

(30) Foreign Application Priority Data

Mar. 19, 1997 (FI) .................................................. 971161

(51) Int. Cl.$^7$ ................................................ C01F 11/18
(52) U.S. Cl. ....................................... 423/432; 423/274
(58) Field of Search .................................. 423/432, 274

(56) References Cited

U.S. PATENT DOCUMENTS 2,081,112 A * 5/1937 Statham et al. ............. 423/432
4,219,590 A * 8/1980 Shibazaki et al. .......... 423/274
4,888,160 A   12/1989 Kosin et al. ................ 423/430

FOREIGN PATENT DOCUMENTS

WO     92 06038    4/1992
WO     96 23728    8/1996

* cited by examiner

*Primary Examiner*—Stuart L. Hendrickson
(74) *Attorney, Agent, or Firm*—Birch, Stewart, Kolasch & Birch, LLP

(57) ABSTRACT

A process and an apparatus for the preparation of precipitated calcium carbonates calcium hydroxide using gaseous carbon dioxide, whereby the carbonation is performed in a gaseous phase by mixing calcium-hydroxide-containing liquor mist with the carbon dioxide gas in a turbulence having an energy intensity in excess of 1000 kW/m$^3$. The reaction is advantageously carried out in an apparatus, comprising at least two serially arranged pin mills having one or more rotatable vane rings which can be used to impose a great energy intensity on the material which is fed into the apparatus, whereby the first pin mill is provided with at least an inlet for slaked lime and carbon dioxide and an outlet for the reaction product, and the second pin mill is provided with an inlet for the product from the previous mill and an outlet for the reaction product. Carbonating is extremely swift. The residence time of the reaction is even less than 1 second. Due to the high energy intensity, carbonation may be performed at high solids contents.

10 Claims, 2 Drawing Sheets

APPARATUS AND PROCESS FOR THE PREPARATION OF PRECIPITATED CALCIUM CARBONATE

This application is the national phase under 35 U.S.C. §371 of PCT International Application No. PCT/FI98/00244 which has an International filing date of Mar. 19, 1998 which designated the United States of America.

BACKGROUND OF THE INVENTION

The present invention relates to a process for the preparation of precipitated calcium carbonate (PCC).

According to such a process calcium hydroxide is carbonated using gaseous carbon dioxide.

The invention also relates to an apparatus for carrying out the carbonation reaction and to a pigment product based on precipitated calcium carbonate.

DESCRIPTION OF THE RELATED ART

Precipitated calcium carbonate is used as a paper filling or coating agent. Other possible fields of use include paints, plastics, the food processing industry, the pharmaceutical industry, etc.

PCC can be prepared by a causticizing process and by a carbonation reaction. In the causticizing process the calcium oxide is slaked whereby calcium hydroxide is formed which is then reacted with sodium carbonate in liquid phase. As a result, caustic soda (NaOH) and calcium carbonate are obtained, the sodium hydroxide remaining in dissolved state while the calcium carbonate is precipitated. Both products are recovered and forwarded to further processing.

In the carbonation process, the calcium hydroxide slurry obtained from slaking lime is reacted with gaseous carbon dioxide. This is typically carried out by charging a carbon-dioxide containing gas, derived from flue gas and having a $CO_2$ content of about 20 to 40%, into the $Ca(OH)_2$ mixture whose solids content is about 20%. The $CO_2$ gas is hereby blown into an aqueous $Ca(OH)_2$ solution whereby the gas is disintegrated into bubbles and the carbon dioxide contained in these bubbles is dissolved in the surrounding water. Carbonate ions are formed which react with the $Ca^{2+}$ ions whereby calcium carbonate is obtained which is precipitated from the solution.

In order to provide an exhaustive account it may be mentioned that calcium hydroxide is reacted with carbon dioxide not only in the preparation of PCC but also in other contexts such as, among others, desulphuration of flue gases and scrubbing in a flue gas scrubber.

A number of considerable disadvantages are related to the prior art processes for preparing PCC. Thus, the conventional causticizing process is hampered by residual salts in the PCC. When, on the other hand, PCC is produced by conventional carbon dioxide carbonation processes, a disadvantage lies in the long carbonation time, typically 1 to 7 h, required by the reaction. In addition, the PCC crystals produces are of varying size and their particle size varies within a very wide range.

The prior art solutions have also been hampered by the difficulty of attaining sufficiently efficient mass transport conditions to enable fast nucleation and the simultaneous generation of a vast number of crystal seeds which would then grow into a vast number of small crystals.

BRIEF SUMMARY OF THE INVENTION

The aim of the present invention is to remove the drawbacks of the prior art and to obtain an entirely novel solution for the preparation of precipitated calcium carbonate from slaked lime and carbon dioxide gas.

The invention is based on the concept of performing the carbonation subject to strong turbulence in a turbulence zone by reacting the carbon dioxide gas with calcium hydroxide particles by the intermediation of random liquid droplets. Thus, in the reaction, gas, liquid and solids particles are contacted with each other simultaneously under intense turbulence and a great energy intensity. The gas flow absorbs the liquid and the particles and forms a turbulent three-phase mixture. The solution according to the invention can also be termed a three-phase process because three phases are simultaneously present, the gaseous phase constituting the reaction medium.

The apparatus according to the invention comprises at least two serially arranged pin mills having one or more rotatable vane rings by means of which it is possible to subject the material charged into the apparatus to a great energy intensity. The first pin mill is furnished at least with an inlet for slaked lime and carbon dioxide and a discharge outlet for the reaction product and the second pin mill is furnished with an inlet for the product from the previous pin mill and a discharge outlet for the reaction product. Gas or blend liquor can, if desired, be fed between the rotating vane rings or groups of vane rings of the pin mills. The pin mills are connected to each other by means of pipes which can be furnished with inlets for blend liquors, if desired.

By means of the invention, completely novel products can be obtained having a shell-like structure. The precipitated particles preferably have a size of 30 to 100 nm and are of spherical shape whereby they are formed of one or several shell-like layers.

The invention offers considerable benefits. Thus, the carbonation of calcium hydroxide is extremely swift. The dwell time of the reaction may be as short as less than 1 second. Due to the great energy intensity carbonation may be performed at a high solids content (even at 40 to 60% by w.)

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The calcium carbonate obtained by the invention is of homogeneous quality; the diameters of the PCC produced may be e.g. 20 to 30 nm, 30 to 50 nm and 50 to 100 i.e. generally within the range from 20 to 100 nm, usually 30 to 100 nm. The minute PCC particles produced can be exploited in various ways: by combining them to form bigger pigment particles by means of van der Waals forces, particle clusters are obtained containing 10 to 30, typically about 15 to 20 joined particles. The formation of these particle clusters can be carried out by adjusting the pH to a value within the range from 6.2 to 10.8 whereby the Z potential of the particles is as small as possible. The particles can also be used for coating other pigments such as kaolin, chalk, talc, or titanium dioxide. The coating can be carried out by feeding the pigments to be coated e.g. in the form of an aqueous slurry together with calcium hydroxide and carbon dioxide into the apparatus of the invention and, if needed, by adjusting the pH value to a suitable range e.g. by introducing acid into the pin mill apparatus during production.

The carbonation is divided into several (e.g. 3 to 7) different process stages. The conversion of calcium carbonate increases step by step; depending on the dry matter content of the calcium carbonate it is usually close to 100 after 3 or 4 stages already. By dividing the process into stages blend components can be added to the different layers of the $CaCO_3$ particle, said components affecting, among other things, the opacity and acidity resistance of the product. As an example a product may be cited prepared by a multi-step process wherein the obtained particles have a core layer consisting of calcium carbonate and a few shell layers consisting alternately of calcium phosphate and calcium carbonate, and a surface layer consisting of, e.g. calcium phosphate. Such a structure will improve the acid resistance of the calcium carbonate particles. In addition, variations in the refractive index between the different layers will provide improved opacity as compared to a mere $CaCO_3$ particle.

The present invention will become more fully understood from the detailed description given hereinbelow and the accompanying drawings which are given by way of illustration only, and thus are not limitative of the present invention, and wherein:

In the following, the invention is examined in more detail by means of a detailed description, the annexed drawings and a number of working examples.

Figure 1A:
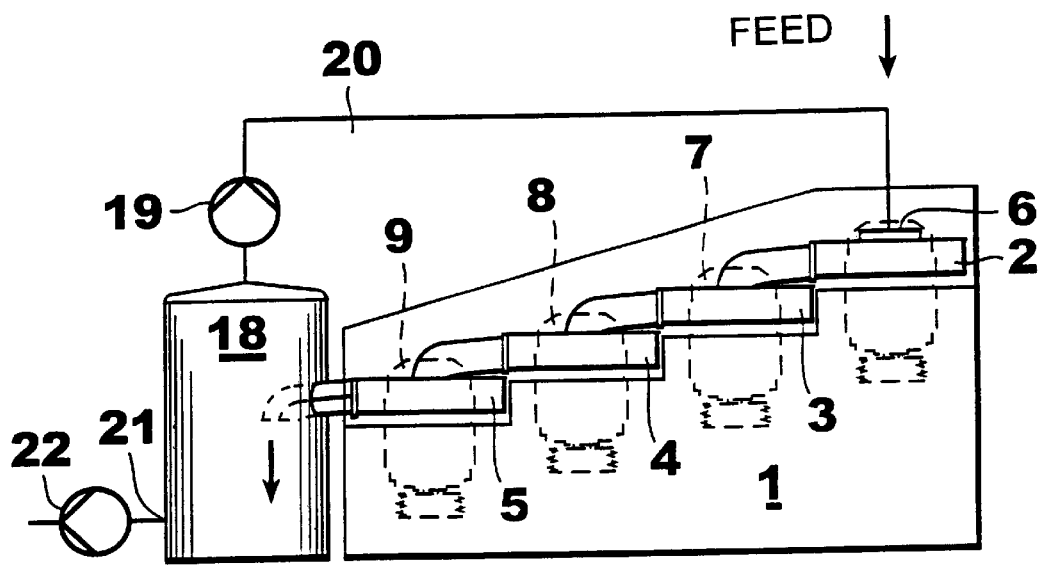
Figure 1B:
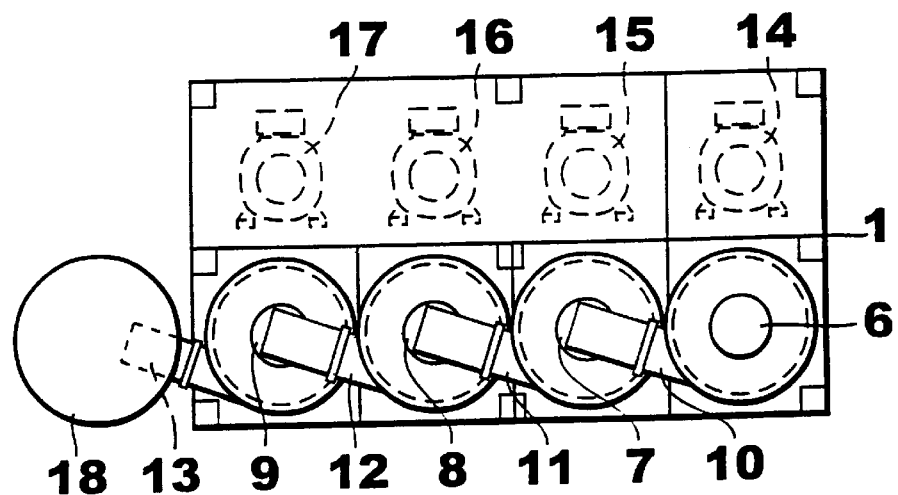

FIGS. 1a and 1b provide a simplified side view and correspondingly a top view of the principal structure of an apparatus consisting of four serially arranged pin mills.

Figure 2:
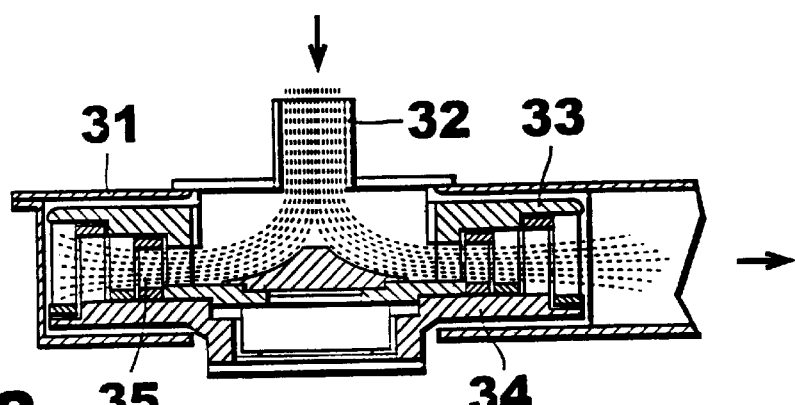

FIG. 2 is a sectional side projection of a pin mill and

Figure 3:
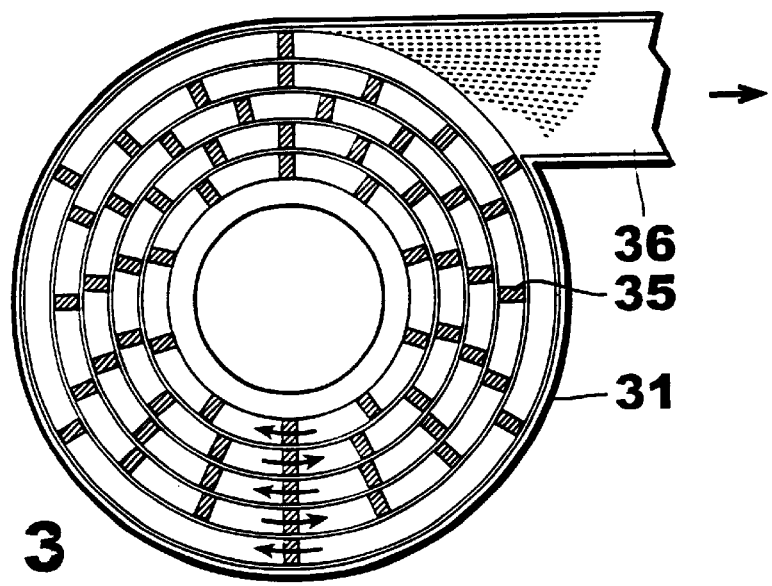
Figure 4:
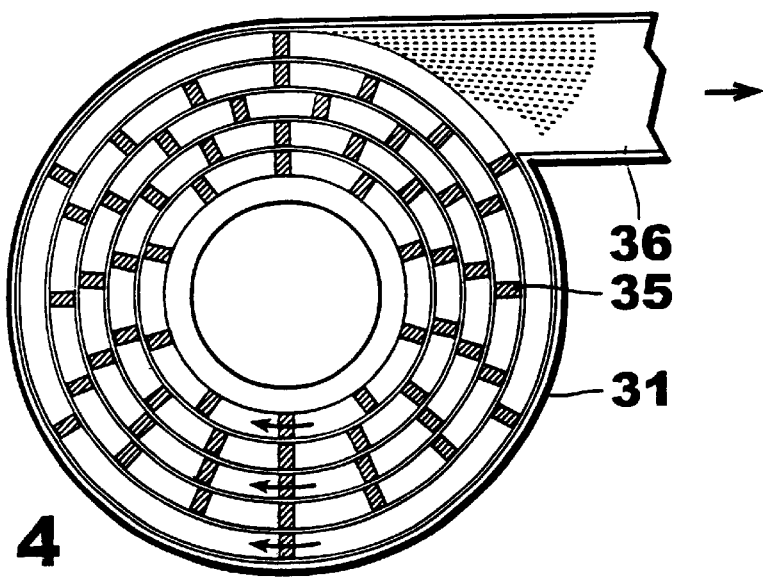

FIGS. 3 and 4 are sectional top views of single and correspondingly double rotor mills.

DETAILED DESCRIPTION OF THE INVENTION

It has been found according to the invention that mass transport conditions in a carbonation reaction can be made highly efficient in gaseous phase. Because the density of gas is smaller than that of liquid, a mixing intensity is achieved in gaseous phase which only requires about 1/1000 of the energy which would have to be used in liquid phase to achieve an equivalent mixing intensity. Subject to turbulence, the gas is reacted with solid particles being in the same mixing state by intermediation of liquid droplets (i.e., almost water droplets).

The carbonating process of the present invention is performed in an aerosol phase, i.e. gaseous phase, water droplets having been dispersed therein and containing mainly $Ca(OH)_2$ as reagent. When a mist of this type is made to repeatedly impinge on the actuator providing the kinetic energy or a gas turbulence generated by the actuator in a rapidly rotated flow channel, the surface is continuously renewed providing a high nucleation rate and, in the end, a great number of minute particles.

According to the invention $CO_2$ gas is therefore subjected to a strong turbulence having an energy intensity of >1,000 kW/m$^3$. $Ca(OH)_2$ slurry is fed into this state, the solution having a solids content of <70%, preferably between 5 and 50%. The volume fraction of the $Ca(OH)_2$ solution/slurry of the gas volume of the apparatus is small, typically smaller than 1%, preferably about 0.1 to 5%. To cite an example, an apparatus having a gas volume of about 40,000 cm$^3$ may be charged with approximately 10 to 200 cm$^3$, advantageously about 50 to 150 cm$^3$, of a calcium hydroxide slurry, and an energy of approximately 2,000 kW/m$^2$ is impinged on this aerosol.

In the turbulence the water droplets are converted into mist and their surface area increases, whereby the $CO_2$ is rapidly dissolved in water. The mist-like water and the water in the diffusion layer on the particle surface stand in efficient interaction. Therefore, the small size of the water droplets produces a large contact surface area and accelerates dissolution. The particles collide into each other producing temperature peaks which for their part accelerate the reaction. Thus, after four turbulence stages a 100% carbonation has taken place with a 20% $CaCO_3$ solution.

The reactions of reactants absorbed in water are converse, i.e. they take place in both directions depending on what forms of occurrence are consumed in the reaction.

Any apparatus is used for providing the turbulence, i.e. as the turbulence zone, capable of producing a high energy intensity in the gas volume. Advantageously, the apparatus is a so called pin mill or a corresponding device (shock mixer) or a bead mill. An advantageous apparatus is described in, e.g. WO Published Application 96/23728. As a rule, the apparatus in question is filled with reagent gas and only contains small volumes of materials in, e.g. liquid or solid phase. This condition can also be met in, e.g. a disc or cone refiner, which are constructed for a totally different purpose.

The turbulence can be generated in one or more apparatuses. It is of particular advantage to perform the reaction in several serially (successively) arranged mixers whereby the same continuous renewal of the surface of the reagent film is performed again and again.

According to the invention it has been found that particularly good results are achieved if carbon dioxide gas of maximum purity is introduced into the reaction. The purity of the $CO_2$ gas should preferably exceed 90%. Correspondingly, advantageous results are obtained with $Ca(OH)_2$ particles having a size which is <1 μm ø. The water used should contain little or no Fe, Nm, or other metals.

FIGS. 1a and 1b illustrate an apparatus according to the invention where four pin mills 2–5 are arranged in series on a steady frame 1. The pin mills may comprise, e.g. single and/or double rotor mixers. Thus, the apparatus comprises vane rings rotating in different directions, or a rotating vane ring and a non-rotating vane ring. A pair of rotors or a pair of a rotor and a stator can be provided with, e.g., five vane rings. The discharge pipe 10–13 from each pin mill 2–4 is connected to the inlet 7–9 of the next pin mill. The feedstock supply, i.e. the supply of slaked lime and carbon dioxide gas occurs through the inlet 6 of the first pin mill. The obtained fluid is transmitted from the outer periphery to the next mixer 3 due to centrifugal forces and underpressure, and from there it is transmitted further to the following mixers 4, 5. The pin mills are driven by actuators 14–17.

The discharge pipe 13 from the last pin mill 5 is fitted inside a gas separator tank or a pumping tank 18. In the pumping tank 18 the fluid is separated into a $CaCO_3$ mixture and a gas which mainly comprises $CO_2$ and aqueous vapour. The $CO_2$ gas is returned to the first mixer 6 of the arrangement via the pump 18 and the recirculation line 20 in order to be reutilized in the process. The product is removed from the tank through the discharge outlet 21 using the pump 22. The $CaCO_3$ mixture can be used as pigment either as such or after a finishing treatment.

The benefit of the arrangement is that mixture components can be fed into the turbulence at the different intermediate stages of the carbonating process. Thus, more $CO_2$ gas and mixture components can be fed into the connecting pipes between the mixers (i.e. the discharge pipes 10–13 of the pin mills).

The apparatus can also be arranged as one device such that a multi-periphery rotor is constructed having a diameter in accordance with the example and the mixture components are fed into the mixing chamber at the stators.

FIGS. 2 to 4 provide sectional side and, correspondingly, top views of the pin mill used in the invention. The pin mill has a drum 31 of fairly low height and a feed orifice (inlet) 32 is provided in the upper part thereof One or more vane rings, or grinding peripheries 33, 34, are arranged inside the drum such that at least one of the rings is rotatably mounted on bearings. The second grinding periphery is statically mounted or rotatable. The planar circumferential disks of the grinding rings are equipped with perpendicular pins 35. In FIG. 3 a double-ring pin mill is shown wherein both grinding rings are rotatable, and FIG. 4 illustrates an embodiment where stators with perpendicular grinding pins are provided between the rotatable pin rings.

As will emerge from FIG. 2, the gap between the sets of grinding rings can be arranged such that it expands in the radial direction.

In addition, a tangential discharge pipe 36 is fitted to the grinding drum.

The densely dashed lines indicate the path of the solid matter/liquid being processed through the pin mill.

As stated above, special benefits are gained by a serial arrangement of several turbulence zones. These can, however, also be replaced by one single pin mill. Thus, an arrangement corresponding to a triple mixer combination can be achieved by a 1400 ø rotor/stator combination having 11 to 15 rotating vane rings. Alternatively, one double-rotor mixer with 5 rings can be combined with one single-rotor mixer with 10 rings. In such a combination it is the double-rotor mixer that prepares the fluid, and the single-rotor mixer processes the fluid further.

The apparatus according to the invention can be used for the preparation of calcium carbonate as well as for the modification of calcium carbonate and other pigments. In the latter case, pigments can, for example, be coated with PCC particles which are used to improve the optical properties of the pigments. According to an advantageous embodiment, blend components are introduced into the carbonating reaction or the modification of pigments. Examples of suitable blend components include $(NaPO_3)_6$, phosphoric acid, hexaneta-, pyro-, tripoly-, poly- or ultra-phosphoric acid, aluminium T, silicic acid chloride or fluoride of aluminium, aluminium sulphate. The blend components can be charged into the reactor in gaseous form.

As an example, an embodiment can be cited wherein the aim is to improve the acid resistance of calcium carbonate. Hereby phosphoric acid $H_3PO_4$ (or a phosphoric acid derivative) is fed into the apparatus in addition to carbon dioxide, and the phosphoric acid is gasified. As solid matter, calcium hydroxide can be used, which is carbonated at the same time, or calcium carbonate prepared earlier with the apparatus, the calcium carbonate being then coated in the apparatus by feeding it again through the apparatus together with the blend components. Both ways are applicable to the treatment of other pigments, too.

| First alterative: | $H_3PO_4$ | gas |
| | $H_2O$ | water |
| | $CaCO_3$ | particles |
| Second alternative: | $CO_2$ gas | |
| | $Ca(OH)_2 + H_2O$ mixture | |
| | powder or mixture of powder + water | |
| | kaolin | |
| | titanium dioxide | |
| | lime ($CaCO_3$) | |
| | ground limestone | |
| | $CaCO_3$ (precipitated $CaCO_3$ (PCC)) | |

An additive is added to the above during an intermediate stage in the process, whereby products differing from $CaCO_3$ as regards their opacity and acid resistance are obtained.

The obtained particles contain e.g. the following:

| Core | $CaCO_3$ |
| Layer | $Ca_3(PO_4)_2$ |
| Layer | $CaCO_3$ |
| Surface | $Ca_3(PO_4)_2$ |

Variations in the refractive index between the different layers provide improved opacity as compared to a mere $CaCO_3$ particle.

The following examples are provided by way of illustrating the invention without limiting its scope of protection. The examples were implemented in the apparatus of FIG. 1 with the following components generally present in the turbulence volume:

| gas | 40,000 cm$^3$ |
| liquid | 80 cm$^3$ |
| particles | 20 cm$^3$ |

EXAMPLE 1

Reaction $Ca(OH)_2 + CO_2 \rightarrow CaCO_3 + H_2O$

Test apparatus Single-rotor mixer energy intensity 2,000 kW/m$^3$

Gas Twice the equivalent amount of $CO_2$—100%

$Ca(OH)_2$ mixture solid matter content 5%
water 95%

TABLE 1

| Result | | Time s | Temperature ° C. | $CaCO_3$ % |
|---|---|---|---|---|
| | | Start | 53 | <10 |
| Stage I | ≈ | 0.04 | 42 | 66 |
| Stage II | ≈ | 0.04 | 42 | 97 |
| Stage III | ≈ | 0.04 | 38 | 100 |
| Stage IV | ≈ | 0.04 | 35 | 100 |
| | < | 1 s | | |

EXAMPLE 2

Reaction $Ca(OH)_2+CO_2\rightarrow CaCO_3+H_2O$

Test apparatus Single-rotor mixer, energy intensity 2,000 kW/m³

Gas $CO_2$—100% feed 2× the equivalent amount $Ca(OH)_2$ mixture solid matter content 10%, water 90%

TABLE 2

|     | Time s | Temperature ° C. | $CaCO_3$, % |
|-----|--------|------------------|-------------|
|     | —      | 40               | 210         |
| I   | 0.04   | 46               | 59          |
| II  | 0.04   | 44               | 90          |
| III | 0.04   | 43               | 99          |
| IV  | 0.04   | 40               | 100         |
|     | < 1 s  |                  |             |

EXAMPLE 3

Reaction $Ca(OH)_2+CO_2\rightarrow CaCO_3+H_2O$

Test apparatus Double-rotor mixer, energy intensity 3,700 kW/m³

Gas $CO_2$—100% feed 2× the equivalent amount $Ca(OH)_2$ mixture solid matter content 20%, water 80%

TABLE 3

|     | Time s | Temperature ° C. | $CaCO_3$ % |
|-----|--------|------------------|------------|
|     | —      | 40               | <10        |
| I   | 0.04   | 46               | 41         |
| II  | 0.04   | 47               | 76         |
| III | 0.04   | 47               | 97         |
| IV  | 0.04   | 47               | 100        |

EXAMPLE 4

Reaction $Ca(OH)_2+CO_2\rightarrow CaCO_3+H_2O$

Test apparatus Double-rotor mixer, energy intensity 5,500 kW/m³

Gas $CO_2$—100% feed 2× the equivalent amount $Ca(OH)_2$ mixture solid matter content 50%, water 50%

TABLE 4

|     | 4 Time s | Temperature ° C. | $CaCO_3$ % |
|-----|----------|------------------|------------|
|     | —        | 50               | <10        |
| I   | 0.04     | 45               | 35         |
| II  | 0.04     | 44               | 64         |
| III | 0.04     | 44               | 86         |
| IV  | 0.04     | 44               | 98         |
| V   | 0.04     | 44               | 100        |
|     | <1 s     |                  |            |

EXAMPLE 5

Reaction $Ca(CO)_2+CO_2\rightarrow CaCO_3+H_2O$

Test apparatus Double-rotor mixer, energy intensity 3,700 kW/m³

Gas $CO_2$—25%, feed 2× the equivalent amount, air—75%

$Ca(OH)_2$ mixture solid matter content 10%, water 90%

TABLE 5

|     |   | Time s | Temperature ° C. | $CaCO_3$ % |
|-----|---|--------|------------------|------------|
|     |   | —      | 33               | <10        |
| I   |   | 0.04   | 38               | 25         |
| II  | ≈ | 0.04   | 38               | 38         |
| III | ≈ | 0.04   | 38               | 48         |
| IV  | ≈ | 0.04   | 39               | 62         |
|     | > | 1 s    |                  |            |

As will emerge from the above table, air admixed with the $CO_2$ hampers the reaction of $CO_2$ with the $Ca(OH)_2$ particle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for the preparation of precipitated calcium carbonate, wherein calcium hydroxide is carbonated with gaseous carbon dioxide, wherein the carbonating is performed in gaseous phase by contacting an aerosol of calcium hydroxide and liquid mist with carbon dioxide gas in a turbulence having an energy intensity in excess of 1,000 kW/M³.

2. The process according to claim 1, wherein the volume of the liquid is less than 1% of the volume of the gas.

3. The process according to claim 1, wherein the carbon dioxide has a degree of purity of at least 90%.

4. The process according to claim 1, wherein the carbon dioxide and the calcium hydroxide are subjected to an energy intensity of approximately 1,100 to 6,000 kW/m³.

5. The process according to claim 1, wherein the calcium hydroxide is carbonated in several serially arranged turbulence zones.

6. The process according to claim 5, wherein a pigment is fed into at least one turbulence zone, and said pigment is coated with Calcium carbonate produced in said turbulence zone.

7. The process according to claim 6, wherein kaolin, titanium dioxide, chalk, ground limestone or precipitated calcium carbonate is fed into at least one turbulence zone.

8. The process according to claim 1, wherein the carbonating is performed in a turbulence zone comprising a pin mill.

9. The process according to claim 1, wherein reactive gas is fed into a turbulence zone in order to modify the calcium carbonate, the gas comprising hydrogen fluoride, aluminum chloride, silicic acid chloride or fluoride, or titanium tetrachloride.

10. The process according to claim 1, wherein the liquid is atomized.

* * * * *